J. B. HAIGHT.
Wire Cinder Shovel.

No. 229,119. Patented June 22, 1880.

ATTEST:
Henry Connett
Arthur C. Fraser.

INVENTOR:
John B. Haight.
pr. J. A. Hurdle
atty

UNITED STATES PATENT OFFICE.

JOHN B. HAIGHT, OF CINCINNATI, OHIO.

WIRE CINDER-SHOVEL.

SPECIFICATION forming part of Letters Patent No. 229,119, dated June 22, 1880.

Application filed February 26, 1880.

*To all whom it may concern:*

Be it known that I, JOHN B. HAIGHT, of Cincinnati, in the county of Hamilton and State of Ohio, have invented certain new and useful Improvements in Wire Cinder-Shovels, the object of which is to remove the coke and cinders from coal-ashes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
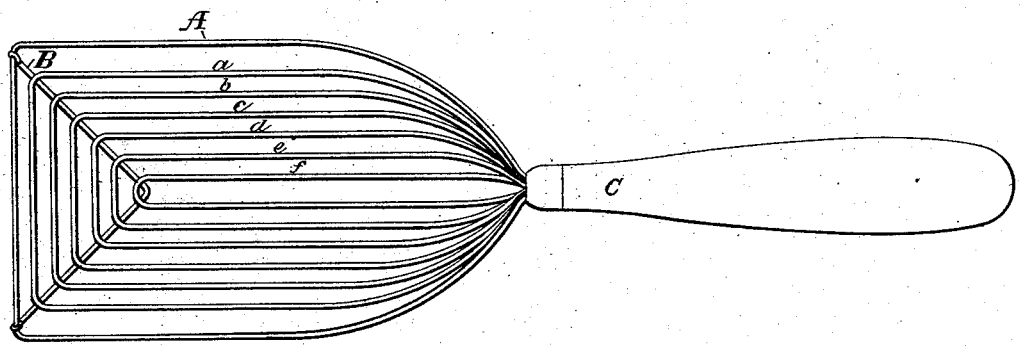
Figure 2:
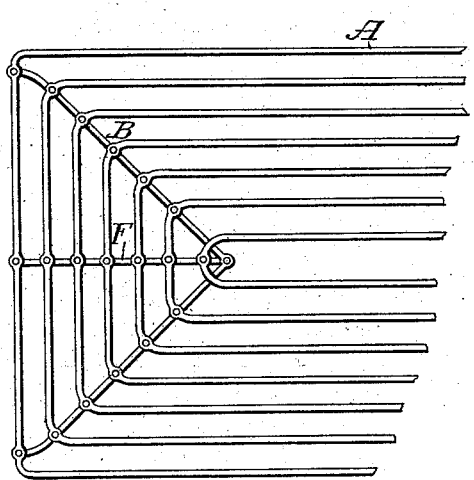
Figure 3:
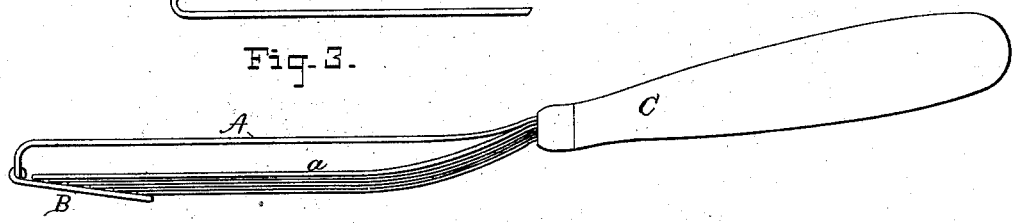

In the drawings, Figure 1 represents a plan of my improved wire cinder-shovel. Fig. 2 represents a modification, showing how the wires are riveted. Fig. 3 represents a side elevation.

The object of my invention is to furnish a device for separating coke and cinders from coal-ashes.

My invention consists of a shovel having a series of wires fastened by both ends to the handle and an angular wire fastened to the same near the forward part, which serves as a brace.

The invention will be more particularly set forth in the specification and pointed out in the claims.

In the drawings, A represents the horizontal wire, forming the extreme edge of the shovel, to which the brace or angular wire B is soldered or riveted.

The horizontal wires *a b c d e f* are twice soldered or riveted to the brace or angular wire B, thereby forming a brace to resist all heavy pressure, and at the same time stiffening the entire frame of the shovel. All the horizontal wires have both ends inserted into the handle C, in which they are fastened permanently.

Fig. 2, A represents the horizontal wires, flattened at their intersection with the angular wire B and center wire, F, for the purpose of being riveted when made of a larger size.

I am aware that perforated sheet-metal shovels have been used heretofore, and are objectionable for the reason that the perforation does not give sufficient escape for the ashes. This objection is obviated by my invention.

Having fully described my invention, what I claim as new, and desire to secure by Letters Patent, is—

1. A wire shovel having both ends of the horizontal wires A *a b c d e f* inserted and fastened in the handle C, from which they extend to the brace or angular wire B, to which they are soldered or riveted, substantially as shown and described.

2. In a wire shovel, the combination of the brace or angular wire B, horizontal wires A, and center wire, F, substantially as shown and described.

In testimony that I claim the foregoing I have hereunto set my hand this 17th day of February, 1880.

JOHN B. HAIGHT.

Witnesses:
EDWARD KNESE,
HERMAN H. KOEHUKEN.